Figure 1:
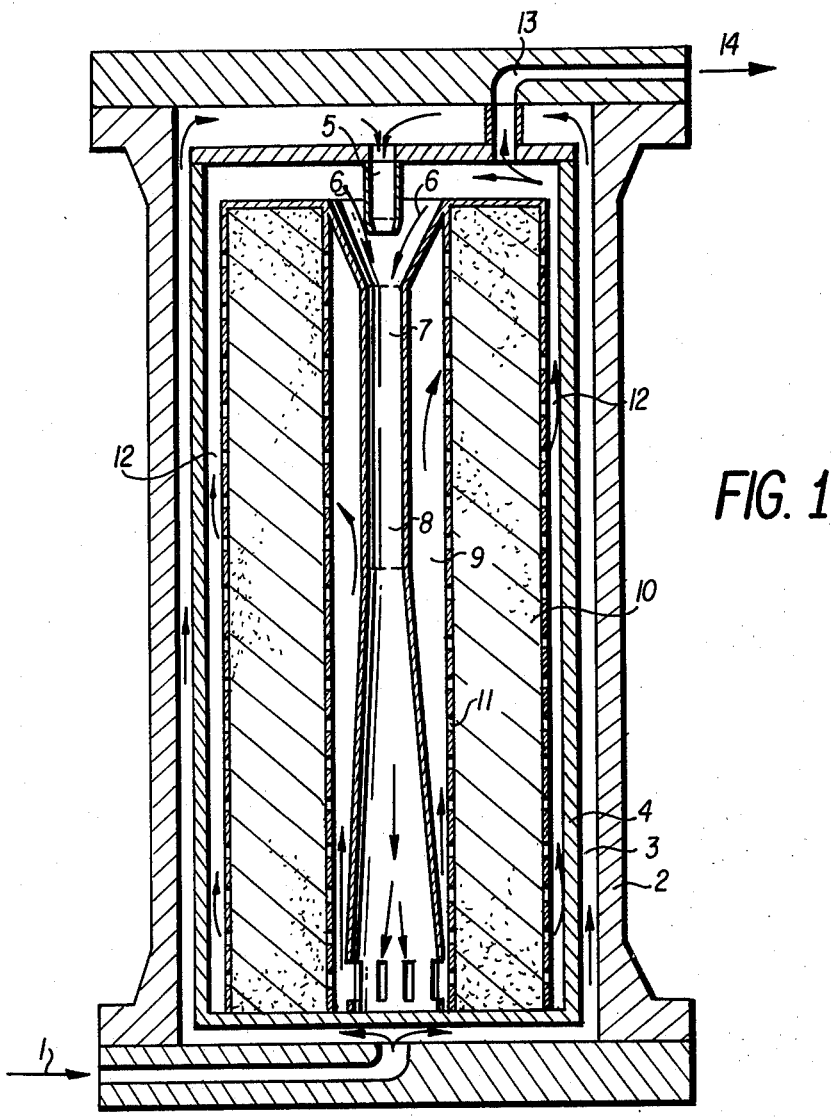

United States Patent [19]

Collina et al.

[11] 3,998,932
[45] Dec. 21, 1974

[54] PROCESS FOR THE CATALYTIC SYNTHESIS OF AMMONIA

[75] Inventors: Amilcare Collina; Emanuele Malfatti; Antonio Cappelli, all of Milan, Italy

[73] Assignee: Montedison S.p.A., Milan, Italy

[22] Filed: Feb. 28, 1975

[21] Appl. No.: 554,192

Related U.S. Application Data

[63] Continuation of Ser. No. 359,355, May 11, 1973, abandoned.

[30] Foreign Application Priority Data

| May 15, 1972 | Italy | 24342/72 |
| Nov. 20, 1972 | Italy | 31854/72 |
| Dec. 22, 1972 | Italy | 33455/72 |

[52] U.S. Cl. .............. 423/362; 423/359; 423/360
[51] Int. Cl.² .......................................... C01C 1/04
[58] Field of Search ........... 423/359, 360, 362, 361

[56] References Cited

UNITED STATES PATENTS

| 1,909,442 | 5/1933 | Williams | 423/362 |
| 2,919,176 | 12/1959 | Gross | 423/362 |
| 3,839,229 | 10/1974 | Senes et al. | 423/362 |

FOREIGN PATENTS OR APPLICATIONS

| 1,561,782 | 1969 | France | 423/362 |
| 286,998 | 1970 | U.S.S.R. | 423/359 |

OTHER PUBLICATIONS

Advances in Petroleum Chemistry & Refining Synthetic Ammonia— Strelzoff & Pan—pp. 331–335.

*Primary Examiner*—Oscar R. Vertiz
*Assistant Examiner*—Eugene T. Wheelock
*Attorney, Agent, or Firm*—Stevens, Davis, Miller & Mosher

[57] ABSTRACT

A catalytic process and apparatus for synthesizing ammonia wherein from 30 to 80% of the effluent gases containing at least 12 molar percent ammonia are recycled to the inlet of the catalyst bed.

3 Claims, 7 Drawing Figures

U.S. Patent  Dec. 21, 1976  Sheet 4 of 4  3,998,932

PROCESS FOR THE CATALYTIC SYNTHESIS OF AMMONIA

This is a continuation of application Ser. No. 359,355, filed May 11, 1973, now abandoned.

The present invention relates to a process for the catalytic synthesis of ammonia, which comprises the direct recycle of a portion of the raw synthesis products. Moreover, the invention concerns a reactor for the catalytic synthesis of ammonia.

Since this type of synthesis is exothermic and considerable heat is developed, it has been customary heretofore to remove heat from the inside of the reactor. The removal of heat is commonly carried out by subdividing the catalytic bed into a plurality of adiabatic layers separated by cooling coils.

Such a process has a number of serious disadvantages. For example, the cooling coils, placed between layers of the catalyst are of a complicated construction and are not completely reliable. Moreover, they are difficult to maintain. Furthermore, the subdivision into different layers makes it necessary to provide a complicated apparatus that must be removable from the pressure shell. Obviously, the constructional complexity is increased with the increasing of the output capacity of the plant.

Thus, one object of this invention is that of reducing the above indicated disadvantages. Other objects will become apparent from the following description.

It has been found that all these objects may be easily attained by a process for the synthesis of ammonia, between 300° and 600° C. and between 100 and 450 Kg/cm$^2$, on adiabatic layer of an iron-based catalyst, by the direct recycle to the inlet of the catalyst layer of between about 30% and 80% of the gases flowing out of the catalyst layer and containing at least 12 molar percent of ammonia with the difference ($\Delta s$) between the molar percentages of the ammonia in the gases flowing out of and respectively into said layer being between about 3 and 6% and the space velocity of said inflowing gases being from 20,000 to 70,000 h$^{-1}$. The space velocity is to be understood as expressed as:

$$\frac{\text{Normal m}^3/\text{hour of inflowing gas}}{\text{m}^3 \text{ of apparent volume of catalyst}}$$

Best results are obtained when the space velocity is between 50,000 and 70,000 h$^{-1}$.

Quite convenient results can be obtained when the mentioned pressure is between about 200 and 300 kg/sq.cm and when the direct recycle is between 60 and 75% of the outflowing gases and contains at least 18 molar percent of ammonia. In this case, the ammonia is preferably partially condensed and separated from the effluent non-recycled and partially cooled gases, through indirect cooling, down to a temperature substantially equal to room temperature, with water, air or any other suitable fluid.

By operating according to this process, it is possible to reach total yields of the same order of magnitude as the yields achievable with the processes so far realized, although in a much easier and cheaper way.

Figure 5:
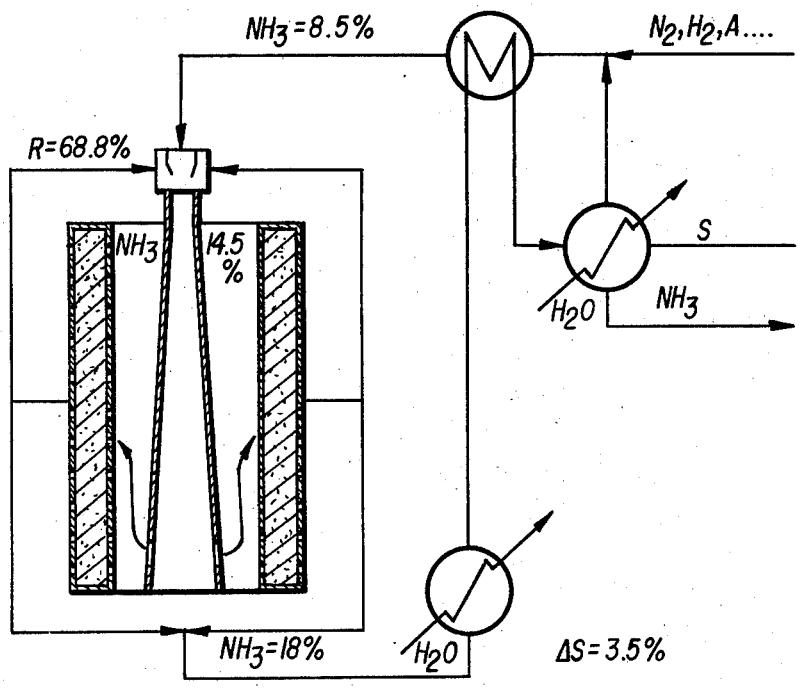

With the process provided by the invention, and diagrammatically represented for illustrative but not limiting purposes in FIG. 5, it is possible, in fact, to realize the synthesis of ammonia in high output reactors that are much simpler and less burdensome than the reactors used so far.

In FIG. 5 it is indicated that the percentage of molar fractions of the ammonia in the inflowing gases, to be admixed to the recycle (R), are different from zero. This is because it is possible, according to the invention, to feed a mixture of reactant gases free from ammonia or, as illustrated, a mixture obtained by adding to the fresh reactants (nitrogen and hydrogen, containing lesser portions of argon, methane and other inert gases) part of the unreacted gases coming from a separation zone (S) in which the ammonia is not completely removed.

Figure 6:
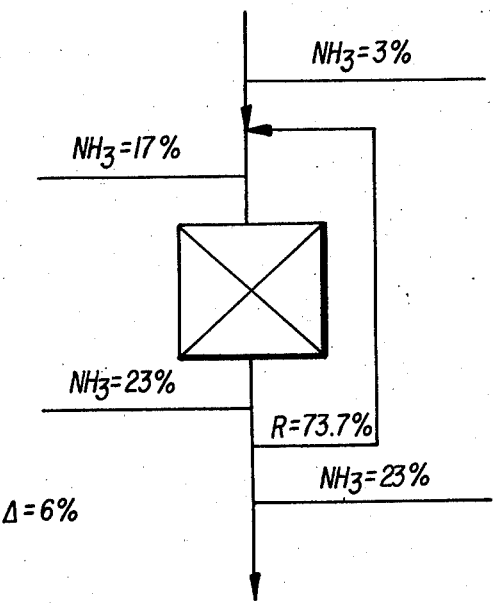

The partial removal of the ammonia may be achieved quite conveniently with a minimum amount of indirect cooling, for instance, with water, utilizing the high partial pressures of the ammonia in the unreacted gases. Through this expedient it is possible to avoid the use of the deep cold refrigerating cycle normally used for reducing the ammonia percentage in the residual gases. Also the figures indicated in FIG. 5 have a purely illustrative and non-limiting value. In FIG. 6, equally for purely illustrative purposes, a different scheme of the ammonia contents in the gases entering the catalytic layer and leaving the same is shown.

The process described hereinabove can be performed in different kinds of apparatuses.

One new and useful apparatus provided by this invention for practicing the process is a reactor having a single cylindrical shaped pressure shell, preferably fitted with dished or hemispherical heads enclosing:

a. an injector complete with a mixing chamber and a diverging diffuser;
b. a catalyst-carrying adiabatic basket having an annular cross-section, whose outside and inside walls are coaxial with and external of the injector and are provided with holes for the distribution and radial flow of the gases coming from the injector; and
c. a thermally insulated jacket which is coaxial with and external of the injector and basket and which recycles part of the gases coming from the basket to the inlet of the injector.

Figure 2:
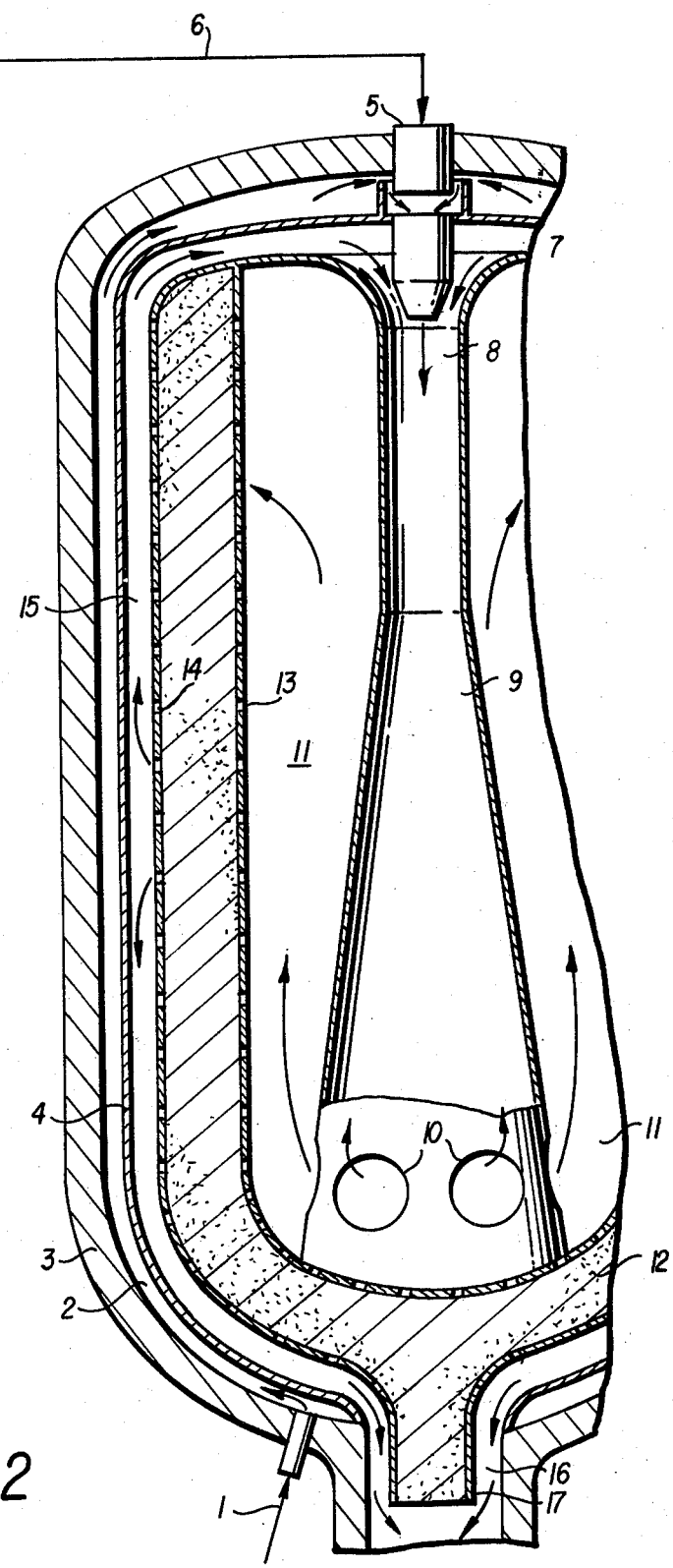

An illustrative but not limiting example is diagramatically represented by FIG. 1. The reactor according to this invention, moreover, comprises conveniently, as illustrated in FIG. 2, an outlet for the discharge of the catalyst, the outlet being located in the lower part of the reactor and preferably in the center of the lower head, and another outlet for the final discharge of the synthesis products, this outlet being located in the lower part of the reactor, preferably in an external coaxial position with respect to the catalyst outlet.

At last, there may suitably be foreseen a thermally insulating interspace between the thermally insulated outside wall of the jacket and the inside wall of the pressure shell, and an inlet that, from the outside, will introduce into the interspace a portion of the feed gas, preferably less than 20% of the total gas, the interspace being connected directly with the inlet of the injector and preferably with the inside cavity of the nozzle of the injector.

Figure 7:
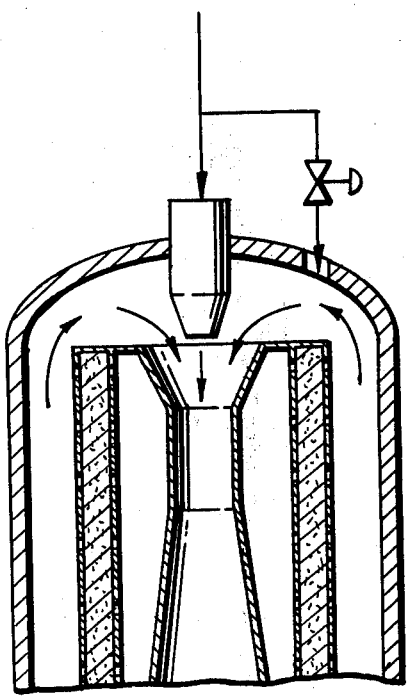

The rating of the recycle ratio between the driving fluid and the recycled gas may be varied by deviating part of the driving fluid towards the recycle, as indicated for instance in FIG. 7. Thereby, the control of the recycle is achieved by means of a fluid valve.

Figure 3:
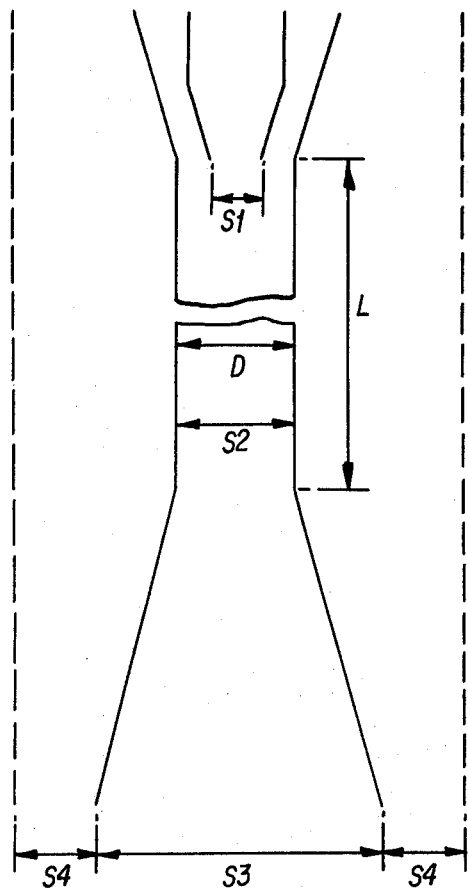

As illustrated in FIG. 3, the areas of the outlet section of the nozzle of the injector $S_1$, of the mixing chamber $S_2$ and of the terminal outlet of the diffuser $S_3$ and moreover the length L and the diameter D of the mixing chamber are in relationship with each other according to the following ratios:

- $S_2:S_1$ = from 3:1 to 10:1

- $S_3:S_2$ = from 10:1 to 18:1

- $L:D$ = from 6:1 to 10:1

Moreover, the ratio between the area of the section $S_3$ and the area of the annular section of the chamber between the external wall of the diffuser and the internal wall of the catalyst-carrying basket $S_4$, must be substantially equal to 1:1.

A further feature of the reactor according to the invention is that the ratio between the area of the openings in the internal and external walls of the catalyst carrying basket is greater than 1 and preferably between 1.1 and 1.5.

Figure 4:
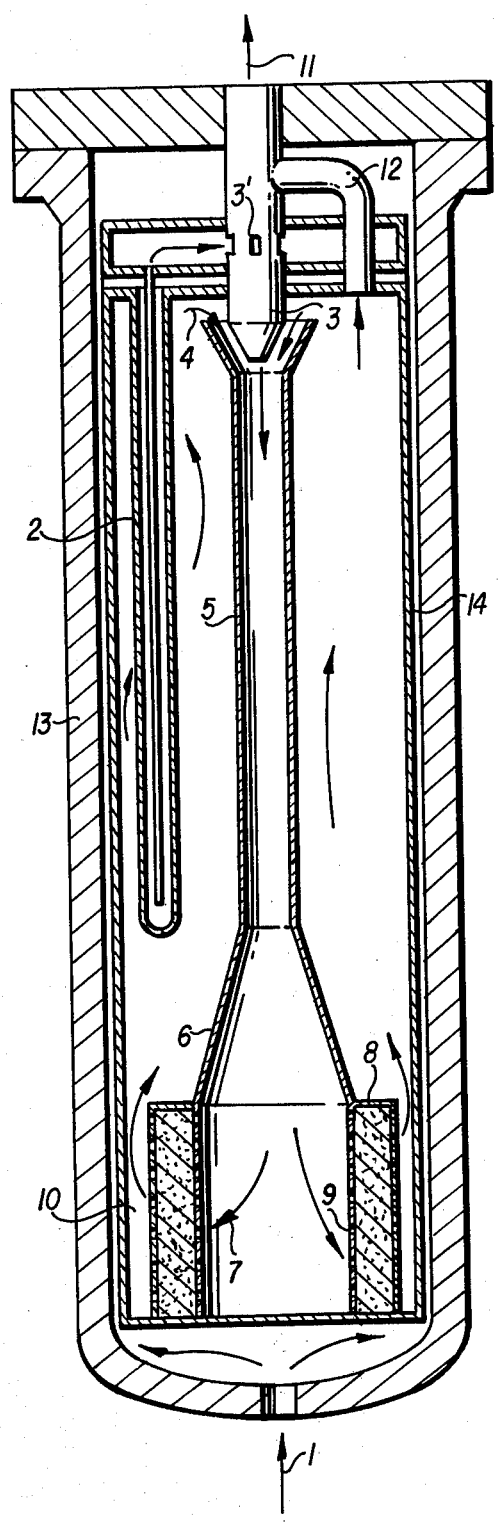

A convenient embodiment of the reactor according to this invention (diagramatically illustrated in FIG. 4) comprises, within the same pressure shell containing the injector, the basket and the jacket hereinabove, also a heat exchanger in which at least part of the recycle gases coming from the basket, indirectly exchanges heat with another fluid. A fluid which does not take part to the reaction, for instance, water, or a fluid involved in the reaction, such as the feed gases which in this way are submitted to a further pre-heating may be used for the heat exchanger.

Many advantages are obtained from the reactor provided by this invention.

One important advantage is, for instance, that discharge of the catalyst may be through the bottom of the reactor by gravity with an appreciable saving in time and in lifting devices that would have to be used if it were necessary to remove the internal parts of the reactor.

The reactors provided by the invention are simpler, of much easier maintenance and less burdensome than those so far available, especially with respect to multilayer reactors. They permit reduction of the pressure and the power drops, though insuring an excellent distribution of the gas.

At least, it is possible to obtain a reduction of the number of control and cooling devices between layers, as well as a reduction of the areas and volumes involved, obtaining a simplification of the problems connected with the thermal expansions.

Having thus described the reactor and the process provided by the invention, the following are illustrative but non-limiting examples.

EXAMPLE 1

As indicated in FIG. 2, a portion corresponding to about 15% of a feed gas flow 1, containing 8.5% of ammonia, at a temperature of 50° C and under a pressure of about 250 kg/sq.cm., penetrates the interspace 2 and laps the inside walls of the pressure shell 3 keeping them at a temperature below 250° C.

From the interspace between the pressure shell and the jacket 4, suitably thermally insulated, the gas passes through a secondary opening into the inside of the nozzle 5, where it is mixed with the remaining portion (35%) of feed gas 6 preheated at a temperature of about 350° C.

The mixture drags the recycle flow 7 from which it directly receives the heat and re-compresses it. The mixture passes then into the mixing chamber 8 and into diffuser 9 and, through the slots 10, into the inside cavity 11 of the centrifugal radial flow catalyst basket 12. This chamber, which extends itself co-axially around the injector body, works to all extents as a gas distributor whose pressure drops are quite negligible in comparison to the ones of the catalytic bed.

Through the inlet 13 and outlet 14 the gases reach the catalyst at a space velocity of about 52,500 $h^{-1}$, where they react and then pass into the interspace 15.

Part of the gases then reach the outlet channel 16 and leave the reactor. The remaining part of the gases forms the recycle 7 which is re-compressed by the injector.

The outlet opening for the gas 16 is arranged coaxially and externally with respect to the catalyst discharging mouth 17. The ratio between total area of openings 13 and 14 is practically equal to 1.4:1.

EXAMPLE 2

According to FIG. 5, a mixture of fresh gas is compressed and mixed with a stream of unreacted gases coming from separation zone S and containing about 10 molar percent of ammonia.

The resulting mixture has a pressure of about 250 kg/sq.cm. and is pre-heated at 335° C by utilizing the heat of the effluent gases from the reactor. The latter comprises an injector arranged inside a cylindrical hollow basket, filled with a catalyst, and the basket itself.

In the injector head the inflowing gas drags a recycle of hot gases that forms about 68.8% of the gases flowing out of the catalytic layer and which contains about 18 molar percent of ammonia. The mixture which comes into contact with the catalyst contains about 14.5 molar percent of ammonia. The recycle brings the temperature of the gases, at the inflow into the catalytic layer, up to about 430° C.

The space velocity is about 52,500 $h^{-1}$.

The portion of the gases flowing out of the catalyst layer, which is not immediately recycled to the injector and leaves the reactor, is first indirectly cooled with water (with consequential production of steam) and then with the feed gases. Finally, these gases are cooled down to about 35° C by means of indirect heat exchange with water.

In this way the ammonia and the other unreacted gases are separated. The latter, as the cooling in S is not very deep, still contain a small portion of ammonia, so that the feed to the injector will contain about 8.5 molar percent of $NH_3$.

Although the invention has been described in detail for the purpose of illustration, it is to be understood that variations can be made therein by those skilled in the art without departing from the spirit and scope of the invention except as it may be limited by the claims.

What is claimed is:

1. A process for manufacturing ammonia with only one catalyst bed which comprises flowing over said catalyst bed containing iron a gaseous feed stream containing nitrogen and hydrogen at a space velocity, temperature and pressure which produce an effluent gas from the said catalyst bed which contains at least 12 molar percentage of ammonia, mixing the said feed stream with from 30 to 80% of said effluent gas recycled directly from the said catalyst bed and passing the resulting mixture at a space velocity of from 20,000 to 70,000 h$^{-1}$, a temperature of from 300° to 600° C, and under a pressure of from 150 to 450 kg/cm$^2$ over the said catalyst bed, the difference between the molar percentage of ammonia in the effluent gas and in the said mixture being from 3 to 6, and recovering ammonia from the nonrecycled portion of the said effluent gas.

2. The process of claim 1 wherein the pressure is 200 to 300 kg./cm$^2$, from 60 to 75% of the gas leaving the catalyst is recycled and the recycled gas contains at least 18 molar percent of ammonia.

3. The process of claim 1 wherein said direct recycle is performed by means of an injection process in which said direct recycle is representing the driven gas.

* * * * *

UNITED STATES PATENT OFFICE
CERTIFICATE OF CORRECTION

Patent No. 3,998,932              Dated December 21, 1976

Inventor(s) Amilcare COLLINA et al

It is certified that error appears in the above-identified patent and that said Letters Patent are hereby corrected as shown below:

The issue date of the patent should be corrected to read --December 21, 1976--.

Signed and Sealed this

Nineteenth Day of April 1977

[SEAL]

Attest:

RUTH C. MASON
*Attesting Officer*

C. MARSHALL DANN
*Commissioner of Patents and Trademarks*